United States Patent [19]

Hayakawa et al.

[11] 4,375,024

[45] Feb. 22, 1983

[54] APPARATUS FOR WELDING BASE PINS OF FLUORESCENT LAMP

[75] Inventors: Masatoshi Hayakawa, Nagoya; Yoshitami Sakazaki, Tajimi, both of Japan

[73] Assignee: CKD Corporation, Komaki, Japan

[21] Appl. No.: 178,108

[22] Filed: Aug. 14, 1980

[30] Foreign Application Priority Data

Dec. 14, 1979 [JP] Japan ................................ 54-162617

[51] Int. Cl.³ ................................................ B23K 9/00

[52] U.S. Cl. ........................................ 219/56; 219/87; 219/127

[58] Field of Search ................... 219/127, 56, 56.1, 87

[56] References Cited

U.S. PATENT DOCUMENTS

| | | | |
|---|---|---|---|
| 3,015,022 | 12/1961 | Bowers | 219/127 |
| 3,061,714 | 10/1962 | Sciver et al. | 219/127 |
| 3,062,950 | 11/1962 | Chyle | 219/127 |
| 3,299,249 | 1/1967 | Sciaky | 219/127 |
| 3,775,583 | 11/1973 | Sano et al. | 219/127 |
| 3,787,657 | 1/1974 | Denis et al. | 219/127 |

FOREIGN PATENT DOCUMENTS 50-8866 8/1975 Japan .

*Primary Examiner*—C. C. Shaw

*Attorney, Agent, or Firm*—Wenderoth, Lind & Ponack

[57] ABSTRACT

An apparatus for welding the base pins of a fluorescent lamp, comprising two pairs of electrode holders disposed along the direction of advancement of said fluorescent lamp with a predetermined distance therebetween and removably holding welding electrodes, a first switch connected to the welding electrodes held by one pair of the two pairs of said electrode holders, a second switch connected to the welding electrodes held by the other pair of the two pairs of said electrode holders, and a switch control connected to the first and second switches, the apparatus being characterized in that the switching operations of the first and second switches are staggered in time by the switch control means in relation to the stepwise movement of the fluorescent lamp.

5 Claims, 4 Drawing Figures

| | 4a | 4b | 4c | 4d | |
|---|---|---|---|---|---|
| $O_{fn}$ | 11 | 0 | 0 | 10 | |
| $S_{f1}$ | 0 | 10 | 0 | 10 | α |
| $S_{f2}$ | 0 | 10 | 0 | 10 | α |
| $S_{f3}$ | 0 | 10 | 11 | 0 | X |
| $O_{s1}$ | 0 | 10 | 11 | 0 | |
| ⋮ | ⋮ | ⋮ | ⋮ | ⋮ | |
| $O_{sn}$ | 0 | 10 | 11 | 0 | |
| $S_{s1}$ | 0 | 10 | 11 | 0 | Y |
| $S_{s2}$ | 11 | 0 | 11 | 0 | β |
| $S_{s3}$ | 11 | 0 | 11 | 0 | β |
| $O_{f1}$ | 11 | 0 | 0 | 10 | β |
| ⋮ | ⋮ | ⋮ | ⋮ | ⋮ | |

APPARATUS FOR WELDING BASE PINS OF FLUORESCENT LAMP

BACKGROUND OF THE INVENTION

In the heretofore used welding apparatuses for welding base pins of a fluorescent lamp and lead wires inserted into the base pins, it has been the general practice to move the fluorescent lamp stepwise by a transfer device to a predetermined station (welding station) where a pair of base pins of the fluorescent lamp are welded by a pair of capacitor discharging arc welding electrodes. However, the conventional apparatus had a disadvantage that in repeated welding of the pins, the tips of the welding electrodes were so contaminated and deformed by the welding sputter and arc that it was necessary to frequently stop the welding operation to clean and reshape the welding electrodes, resulting in a considerable reduction in the rate of operation of the base pin welding apparatus and adverse affects on the entire system in operative association therewith.

SUMMARY OF THE INVENTION

The present invention relates to an apparatus for welding base pins of a fluorescent lamp.

An object of the present invention is to provide a welding apparatus capable of continuing arc welding without frequently stopping the operation of the base pin welding apparatus and having an arrangement of the welding electrodes which may be easily removed for repair and maintenance.

The apparatus for welding the base pins of a fluorescent lamp according to the present invention is characterized in that it comprises two pairs of electrode holders disposed along the direction of advancement of said fluorescent lamp with a predetermined distance therebetween and removably holding welding electrodes, a first switch connected to the welding electrodes held by one of the two pairs of electrode holders, a second switch connected to the welding electrodes held by the other of the two pairs of electrode holders, and a switch control connnected to the first and second switches, in which the switching operations of said first and second switch are staggered in time by the switch control in relation to the stepwise movement of the fluorescent lamp.

BRIEF DESCRIPTION OF THE DRAWINGS

The invention will be better understood from the following description taken in connection with the accompanying drawings in which.

DETAILED DESCRIPTION OF THE PREFERRED EMBODIMENTS

Figure 1:
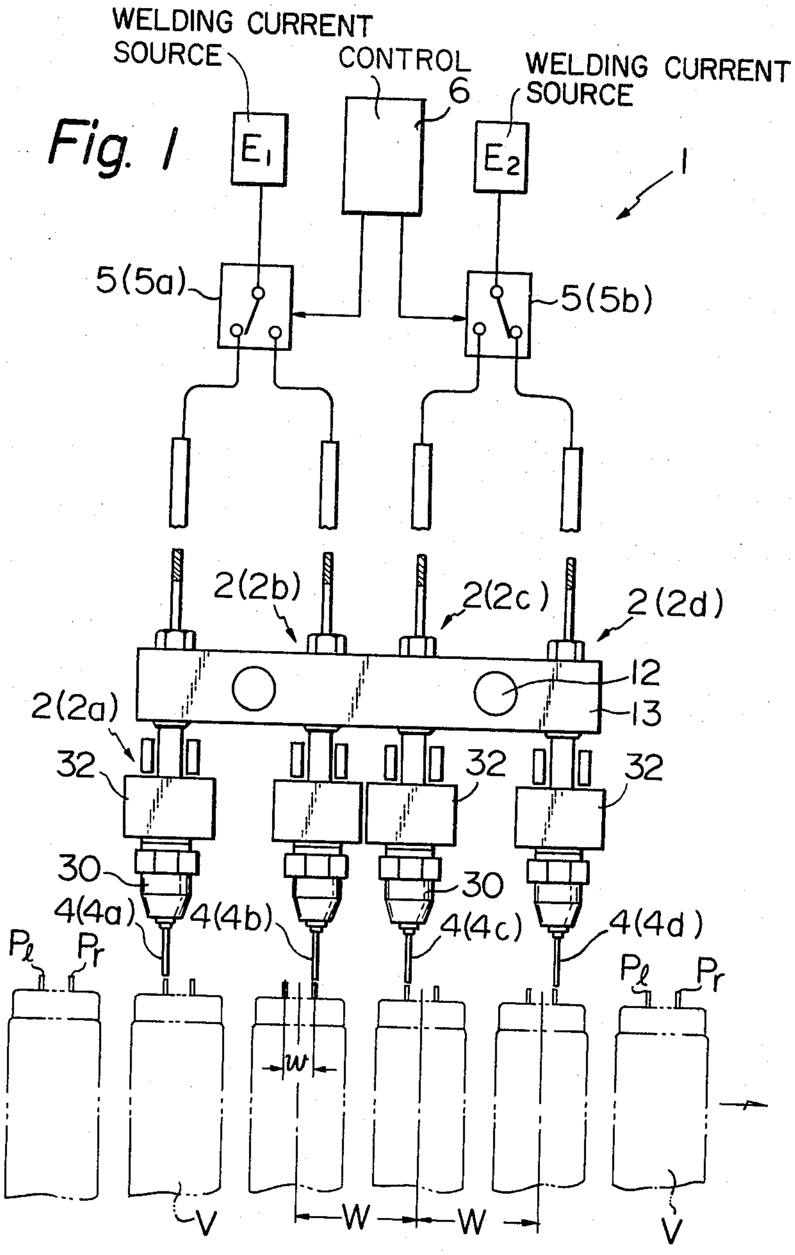
FIG. 1 is a plan view of the base pin welding apparatus according to the present invention.

A preferred embodiment of the present invention will now be described in detail with reference to the drawings. FIG. 1 shows an embodiment of a welding apparatus 1 according to the present invention, comprising two pairs of electrode holders 2a, 2b and 2c, 2d disposed in parallel to each other with a predetermined distance therebetween along the direction of advancement of fluorescent tubes V which are arranged horizontally and transported sideways by a known conveyer, a first switch or relay 5a connected electrically to a first power source E, and to welding electrodes 4a, 4b held by electrode holders 2a, 2b, a second switch or relay 5b connected electrically to a second power source $E_2$ and to welding electodes 4c, 4d held by electrodes holders 2c, 2d, and a switch control 6 connected to switches 5a and 5b for causing the switch relays to perform switching actions.

The distance between the electrode holders 2a and 2b and the distance between the electrode holders 2c and 2d are equal to the sum of the distance of one stepwise movement of the fluorescent tube, that is the distance W between two adjacent fluorescent tubes and the distance w between a pairof base pins Pl, Pr at an end of the fluorescent tube, that is W+n, and the distance between the electode holders 2b and 2c is equal to the remainder W−w so that a pair of the base pins Pl, Pr can be welded to the base of the fluorescent tube by any one set (for instance, the set of 4a and 4d or the set of 4b and 4c) of two pairs of the welding electrodes.

Figure 2:
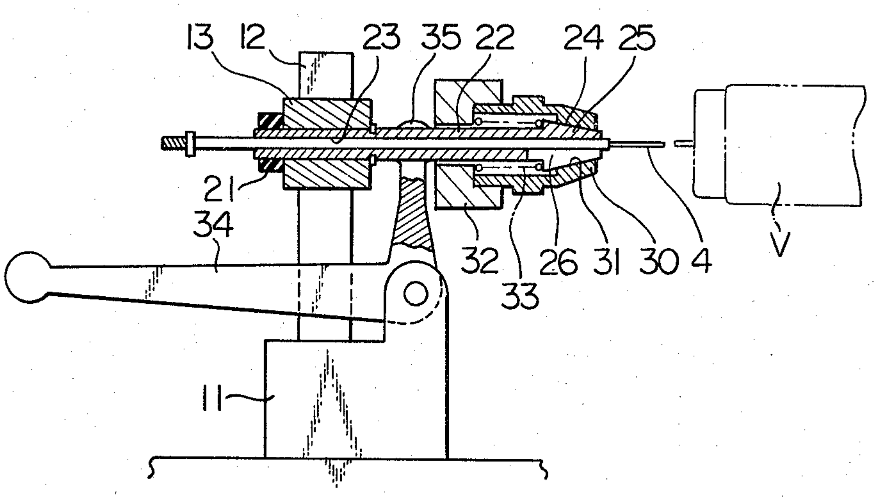
FIG. 2 is a sectional view of the electrode holder of the base pin welding apparatus of FIG. 1.

The electrode holders 2a, 2b, 2c and 2d are mounted horizontally with the distance therebetween on a mounting plate 13 mounted horizontally by supports 12 on a support base 11 as illustrated in FIG. 2 and extending in the direction of advancement of the fluorescent tube.

Each of the electrode holders 2a, 2b, 2c and 2d has a tube or collet chuck member 22 secured to the mounting plate 13 of an insulator member 21 provided centrally with an axial through hole 23 for receiving the welding electrode therethrough, and at an end with a head 25 having a tapered outer surface 24. The head 25 of the collect chuck member 22 is provided with a plurality of axially extending slots 26 arranged circumferentially with equal distance therebetween.

On the outside of the head 25 is fitted a clamp ring 30 having a tapered inner surface 31 for engagement with the tapered outer surface 24 of the head 25, and behind the clamp ring 30 is fixed an insulator ring 32. Between the insulator ring 32 and the rear surface of the head 25 is provided a compression spring 33 which urges the insulator ring 32 and the clamp ring 30 rearwards with respect to the collet chuck member 22 so that the collet chuck member securely holds the welding electrode by the action of the tapered inner surface of the clamp ring 30.

The clamp ring 30 is removed from the head 25 for replacement of the welding electrode by turning a release lever 34 pivotally attached to the support stand 11 and pushing the insulator ring 32 with a bifurcated end 35.

The switch relays 5a, 5b are of a well-known construction for electrically operating to connect the source of electric current to either of the welding electrodes.

Figure 3:
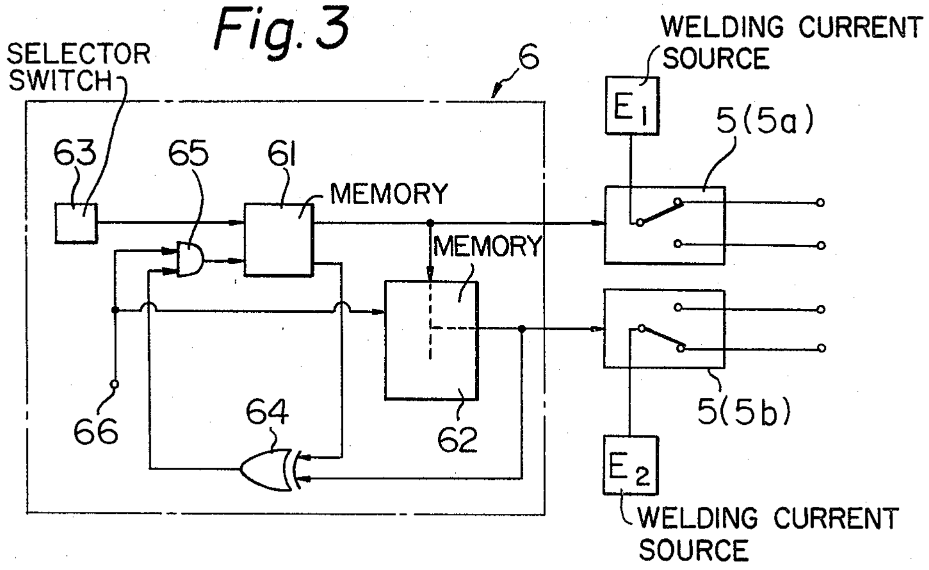
FIG. 3 is a circuit diagram of the switch control means of the base pin welding apparatus according to the present invention.

Referring to FIG. 3, the switch control 6 comprises a first memory 61, a second memory 62, an electrode selector switch 63, a safety circuit or interlock circuit 64, and an AND circuit 65, which are connected as shown in FIG. 3.

In the switch control means 6, the first and the second switch relays 5a and 5b connect welding current sources $E_1$ and $E_2$ alternatively to the welding electrodes 4a or 4b and 4c or 4d, respectively, and are controlled by the first and the second memories 61 and 62, respectively. To the first memory 61 is applied a signal "0" or "1" by the electrode selector switch 63. The second memory 62 has a shift register therewithin to shift the memory for each input of a pulse corresponding to the stepwise movement of the fluorescent tube to a terminal 66 and to apply a control signal to the switch relay 5b after the shift has been made a predetermined number (2 in this embodiment) of times. That is, the second memory delay the output of the first memory to control the switch relay 5b.

After the selector switch 63 has been set, the switch relays 5a and 5b are automatically switch controlled (sequence controlled) by the first and the second memories, respectively, and, in this case, even when the selector switch 63 is operated in error, the relays 5a and 5b operate properly as programmed without executing the erroneous instruction because there is provided the interlock circuit 64 (a sefety circuit for deciding whether or not the combination of the electrodes is in the steady state).

The AND circuit 65 applies a pulse from the terminal 66 to the memory 61 when the interlock circuit 64 is operated (the switch relays 5a and 5b are not in the process of switching). Accordingly, the switch relays 5a and 5b are switch controlled in synchronization with the timing of the pulse from the terminal 66.

Further, a synchronous pulse generated by known means when the fluorescent lamp transport conveyor moves stepwise is applied to the terminal 66.

The operation of the welding apparatus according to the present invention will now be described in due order.

At first, the selector switch 63 is set to a first select state, for instance "1," whereby the welding electrodes 4a, 4d are in the steady operation state while the other welding electrodes 4b, 4c are in the non-operation state and can be freely removed. For inspection and repair of the welding electrode 4a or 4d, the selector switch 63 is set to "0". In synchronization with the pulse from the terminal 66 the signal from the selector switch 63 is applied to the first memory 61 which applies the signal to the switch relay 5a and the second memory 62, whereby the switch relay 5a is immediately switched and the relay 5b is delayed three steps through the memory 62 and switched to operate the welding electrodes 4b and 4c.

Figure 4:
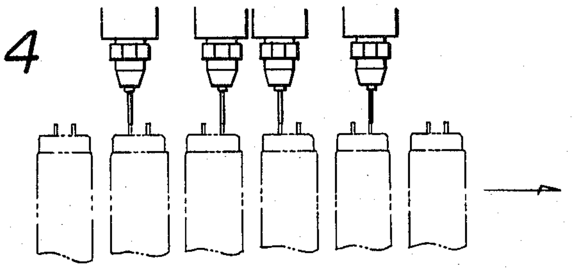
FIG. 4 is a diagrammatical illustration of the switch sequence of the welding apparatus of FIG. 1.

FIG. 4 represents in symbols the switching operation between the two pairs of the welding electrodes 4a, 4b and 4c, 4d.

In FIG. 4 numeral 0 denotes that the base pin is not welded, 10 denotes that one base pin Pr is welded and 11 denotes that the other base pin Pl is welded.

That is, stage Ofn is the first steady operation state in which the electrodes 4a and 4d are operated to move the fluorescent lamp stepwise from step to step so that the base pins Pl and Pr are welded by the welding electrodes 4a and 4d, respectively.

Stages $Sf_1$ to $Sf_3$ are the first switch sequence. In the stage $Sf_1$ the selector switch is actuated to connect the electric current source from the welding electrode 4a to the welding electrode 4d to initiate the first switch sequence. In the stage $Sf_2$ the switch relay 5b is delayed in operation and is not yet switched.

In the stage $Sf_3$ the switch relay 5b is controlled to delay by the memory 62 and is switched in this step to complete the first switch sequence. After this step is the second steady operation state in which the welding electrodes 4b and 4c weld the base pins Pl and Pr.

After this step in the stage $Os_1$ is the second steady operation state in which the welding electrodes 4b and 4c are operated and the other welding electrodes 4a and 4d heretofore operating may be removed for repair. The second steady operation state as well as the first steady operation state can be continued to an arbitrary stage Osn until repair of the electrodes becomes necessary.

Stages $Ss_1$ to $Ss_3$ are the second switch sequence for returning the operation of the welding electrodes from 4b, 4c to 4a, 4d. By returning the selector switch 63 in the stage $SS_1$ the switch sequence reverse to the above-described operation is started and completes in the stage $Ss_3$. Accordingly, after the stage $Ss_3$ the welding electrodes 4b, 4c are in the non-operable state and can be repaired.

Even in the sequence execution step the base pins Pr and Pl are welded securely without duplication. That is, as shown in FIG. 4, the fluorescent lamp passes the movement steps in which it is opposed to the electrodes 4a, 4b, 4c and 4d sequentially and passes the welding steps as indicated by arrow X, in which the pins Pl (11) and Pr (10) are welded in $Sf_1$ and no welding is performed thereafter. Arrow Y indicates the steps in the second steady state in which suitable and secure welding is performed.

Even if the selector switch 63 is actuated during execution of the first or second sequence $\alpha$ or $\beta$, execution of the instructions is delayed by the interlock circuit until the completion of the sequence.

As described above, the welding apparatus according to the present invention provides advantages such that the welding electrodes can be removed for repair or maintenance without stopping the welding operation and the selector switch is safe against erronous actuation thereof.

Further, the welding electrodes may be arranged with various distances therebetween. For example, the distance between the welding electrodes 4a and 4b and between 4c and 4d may be $W-w$ while the distance between 4b and 4c is $W+w$ or the welding electrodes may be disposed for every other fluorescent tube, that is at spacing of $2W+w$ and $2W-w$.

While we have shown and described specific embodiments of the invention, it will be understood that these embodiments are merely for the purpose of illustration and description and that various other forms may be devised within the scope of the invention, as defined in the appended claims.

What is claimed is:

1. An apparatus for welding a first base pin at a first location and a second pin at a second location on each of a line of fluorescent lamps arranged along a path for advancement in a direction of advancement, equally spaced by a predetermined distance W, the first pin and second pin on each fluorescent lamp being spaced from each other a predetermined distance w along the path, the lamps being advanced stepwise the distance W in the direction of advancement, said apparatus comprising:

first, second, third, and fourth successively adjacent electrode holders for respectively removably holding first, second, third and fourth welding electrodes, disposed spaced along the path; said first and second electrode holders being spaced from each other a predetermined distance $D_1$ along the path; said third and fourth electrode holders being spaced from each other the predetermined distance $D_1$ along the path; said second and third electrode holders being spaced a predetermined distance $D_2$ along the path; said distances $D_1$ and $D_2$ being such that said first and third welding electrodes are both aligned with said lamps for welding only first base pins and said second and fourth welding electrodes are both aligned with said lamps for welding only second base pins;

first switch means, responsive to a first input signal, for alternatively electrically connecting said first and second welding electrodes to an electrical power source;

second switch means, responsive to a second input signal, for alternatively electrically connecting said third and fourth welding electrodes to said power source;

switch control means for providing said first input signal to said first switch means to switch the connection of said power source fom one of said first and second welding electrodes to the other, and for providing said second input signal to said second switch means to switch the connection of said power source from one of said third and fourth electrodes to the other when the lamp located at said second electrode holder when said first input signal is provided to said first switch means arrives at said fourth electrode holder, so that either said first and fourth welding electrodes or said second and third welding electrodes may be removed without stopping the welding operation or failing to weld any of said first and second pins to said lamps.

2. An apparatus as in claim 1, wherein one of said predetermined distances $D_1$ and $D_2$ is equal to the distance $W+w$, the other of said predetermined distances $D_1$ and $D_2$ being equal to the distance $W-w$.

3. An apparatus as in claim 1 wherein said first, second, third, and fourth electrode holders are spaced such that said first, second, third, and fourth welding electrodes are aligned with alternate ones of said lamps along the path, whereby one of said predetermined distances $D_1$ and $D_2$ is equal to $2W+w$ and the other of said predetermined distances $D_1$ and $D_2$ is equal to $2W-w$.

4. An apparatus as in claim 1, wherein each of said first, second, third and fourth electrode holders comprises an insulator member, a tube, fixed to said insulator member, for receiving a welding electrode therethrough, a collet chuck provided at an end of said tube, for securely holding the welding electrode within said tube, and a lever for opening said collet chuck.

5. An apparatus as in claim 1 or claim 4, wherein said switch control means comprise:

a first memory, responsive to said stepwise movement of said lamps and to a selection signal, for providing said first input signal to said first switch means;

a second memory, responsive to stepwise movement of said lamps and said first input signal, for providing said second input signal to said second switch means after a predetermined member of stepwise movements of said lamps following said first input signal; and interlock circuit means, responsive to said first input signal and said second input signal, for preventing said first memory from providing a subsequent first input signal before said second memory has provided said second input signal to said second switch means.

* * * * *